United States Patent Office 3,455,759
Patented July 15, 1969

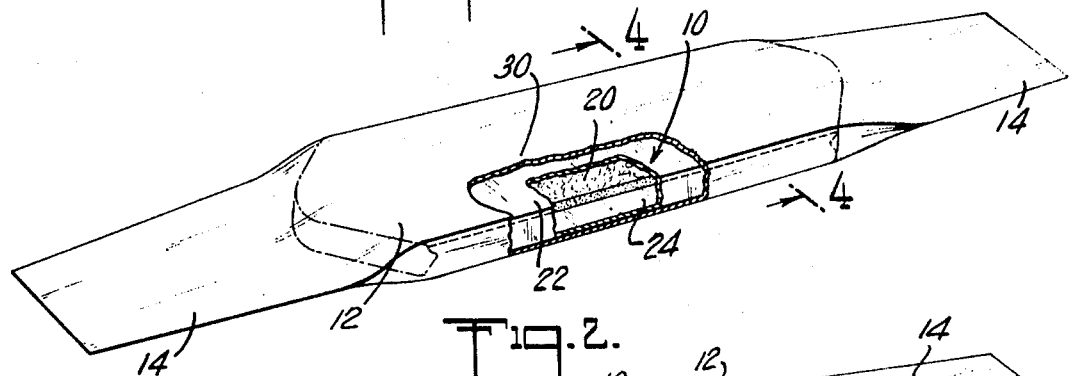
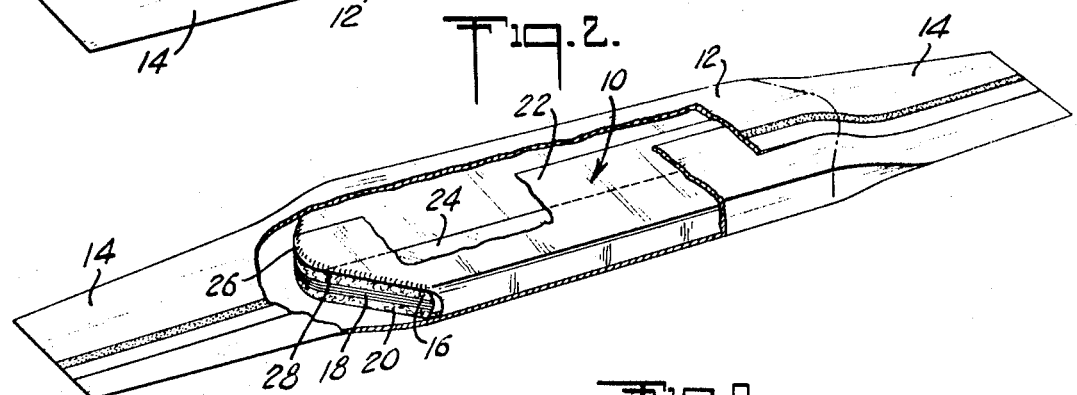
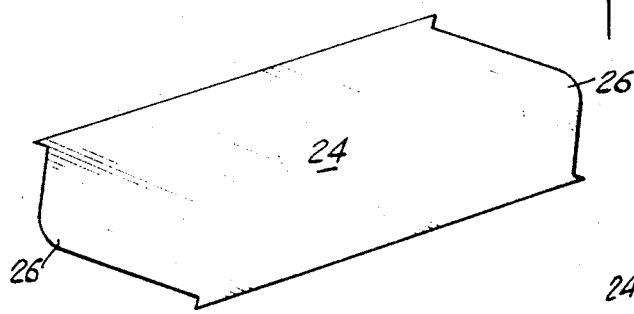
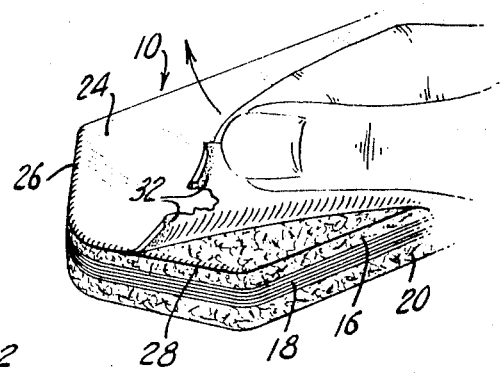
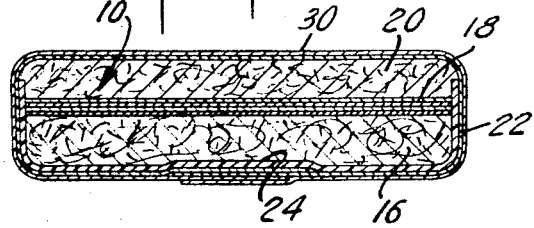

3,455,759
METHOD OF MAKING AN ABSORBENT PRODUCT
Edward A. Morse, Fanwood, N.J., assignor to Johnson & Johnson, a corporation of New Jersey
Original application Apr. 26, 1963, Ser. No. 275,927, now abandoned. Divided and this application Apr. 20, 1966, Ser. No. 543,836
Int. Cl. B32b 31/18, 31/20
U.S. Cl. 156—251                 6 Claims

ABSTRACT OF THE DISCLOSURE

A method for maintaining fluid barrier films in desired positions, both during the manufacture of sanitary napkins and also when such sanitary napkins are in use, by covering one surface of a relatively thick, cellulosic, fibrous layer with a thermoplastic film and simultaneously cutting the thermoplastic film and the layer of cellulosic fibrous material so as to form a compression bond between the cut edge of the thermoplastic film and the cut edge of the cellulosic fibrous layer adjacent thereto.

This application is a divisional application of my copending U.S. application, Ser. No. 275,927, filed Apr. 26, 1963, now abandoned.

BACKGROUND OF THE INVENTION

This invention relates to sanitary napkins and more particularly to improvements in sanitary napkins containing plastic films as liquid-repellent barriers to improve the fluid-absorbency and fluid-retentivity characteristics of the napkins.

Liquid-repellent components have been included in sanitary napkins to obtain more effective distribution of the menstrual fluid absorbed by the absorbent core portion of the napkin. They have also been included to prevent the fluid from striking through the bottom of the napkin. One type of liquid-repellent component which has been so used consists of a film of plastic positioned in the absorbent core portion of the napkin. Because they are essentially impermeable, plastic films are not only effective in preventing strike through of fluid through the napkin, but also aid in the lateral distribution of the fluid in the absorbent core portion of the napkin so that its absorbing capacity may be more effectively utilized.

The liquid-repellent plastic film may be positioned in the interior of the absorbent core portion of the napkin to provide a so-called two-way napkin, or it may be positioned on or adjacent to the bottom of the absorbent core portion of the napkin to provide a so-called one-way napkin. A two-way napkin may be positioned with either side against the body while a one-way napkin may be used only with one side positioned against the body. While applicable to both forms, in its preferred form, this invention relates to one-way napkins.

Thermoplastic films, such as films of polyethylene, are especially suitable as barriers because, in addition to being essentially impermeable to liquids, they are flexible, economical and are available in very thin form. However, due to their smooth surface characteristics, such films are slippery and tend to shift from their desired position in the napkin. The tendency to shift is increased when the napkin is wet with menstrual fluid because the fluid lubricates the surface of the film. Due to their slippery characteristics, the films may also permit other components in the napkin to slide with respect to each other and thus become displaced from their intended and desired positions within the napkin.

The use of such plastic films as liquid barriers in napkins may, because of their slippery characteristics, also cause problems during manufacture of the napkins. Sanitary napkins containing such films may be made by placing the film over the surface or in the interior of the absorbent core portion of the napkin, and then wrapping the film and core within a liquid pervious cover whose ends extend beyond the ends of the film-covered core to form attachment tabs. During assembly of the film and the absorbent core, and during the wrapping of the cover about the film and the core, the film may tend to shift with respect to the cover and core and become displaced from its desired position. When films having a thickness of the order of 1 mil or less are used, the problems become more pronounced since films of such low thicknesses are extremely light in weight and are difficult to handle.

Shifting of the film both during manufacture and in use may be reduced or eliminated by adhesively bonding the film to the absorbent core. However, the use of an adhesive necessarily increases the cost of the finished napkin, requires additional equipment and adds additional steps during its manufacture.

SUMMARY OF THE INVENTION

I have discovered that by placing a thermoplastic film having a suitable softening point adjacent to a fibrous component in the absorbent core portion of the napkin and then simultaneously cutting the film and the fibrous component in accordance with conventional napkin manufacturing techniques, the portions of the film adjacent to its cut edges and the portions of the fibrous component adjacent to its cut edges may be joined together sufficiently to retain the film in its desired position with respect to the absorbent core portion of the napkin. This not only reduces the tendency of the film to shift during manufacture of the napkin, but also retains the film in position in the napkin during handling and in use.

In cutting a plastic film and a layer of fibrous material with conventional cutting devices in accordance with conventional sanitary napkin manufacturing techniques to form the absorbent core portion of a napkin, one member of the device acts, in effect, as a cutting blade and the other, in effect, as an anvil. As an incident to cutting, a compressive force is exerted on the portions of the film and the fibrous layer adjacent to the portions which are cut. If a plastic film having a suitable softening point is used, this compressive force is sufficient to unite the edge portions of the film and the edge portions of the fibrous layer adjacent to the cut by a compression-type bond.

Not all thermoplastic films will form such a compression-type bond under prescribed conditions. In addition, certain types of thermoplastic films will form the bond more readily than others, or will form a stronger bond. For this reason, a plastic film having a low softening point is used. Most thermoplastic films do not have sharp melting points, but instead become progressively softer over a range of temperatures. The temperatures at which different films soften vary. Those films having a high softening point, such as films formed of high density polyethylene having a softening point of about 140° C., polypropylene having a softening point of about 130° C. and nylon, do not soften sufficiently to form the compression-type bond when conventional cutting devices are used. Therefore, the film selected should be of the type which will soften sufficiently to form the desired bond as a result of the manufacturing techniques which are used in making the napkin.

The type of film selected may be affected by the type of cutting devices employed and also with the speed of operation of the device. In high speed operations, the cutting members of the cutting device may become heated. The heat generated will assist in the formation of the compression bond between the film and the fibrous layer, and if of a high degree, may permit the use of plastic materials which have a somewhat higher softening point. Conversely, if the extent to which the cutting devices become heated is low, a plastic film having a low softening point should be used.

Reference is made to the accompanying drawings wherein a preferred embodiment of the invention is illustrated by way of example.

In the drawings:

FIG. 1 is a perspective view of a napkin incorporating my invention, partially cut away to reveal its inner construction;

FIG. 2 is a view of the napkin of FIG. 1 in an inverted position; partially cut away to illustrate the plastic film associated with the absorbent core portion of the napkin;

FIG. 3 is a view of the plastic film incorporated into the napkin of FIGS. 1 and 2;

FIG. 4 is an enlarged sectional view of FIG. 1 taken along lines 4—4; and

FIG. 5 is a perspective view of the end of the absorbent core portion of the napkin, illustrating the manner in which the film is secured to a fibrous component in the core.

One form of napkin incorporating the invention includes a relatively thick, elongated absorbent core 10 enclosed within a liquid pervious wrapper 12 whose ends extend beyond the ends of the absorbent core to provide the usual attachment tabs 14. The absorbent core may be about two and one-half inches wide and eight inches long and may consist, by way of example, of a bottom layer 16 of comminuted wood pulp fibers weighing about 50 grains, intermediate plies 18 of absorbent bleached, sulfite paper wadding weighing about 9 pounds per ream, and a top layer 20 of comminuted wood pulp fibers weighing about 50 grains. These components may be enclosed within a sheet of creped paper 22 which weighs about 10 pounds per ream. The entire core assembly is enclosed within the liquid pervious wrapper 12.

A thin flexible film 24 of polyethylene having a low softening point, and approximately one mil thick, is positioned between the creped paper 22 and bottom layer 16 of wood pulp fibers and covers the bottom of the layer of wood pulp fibers and extends part way up the sides of the absorbent core. A sanitary napkin having an absorbent core constructed in this manner is of the one-way type since the film is adjacent to one surface of the core. The thermoplastic film is coextensive with the absorbent core and is bonded at its end portions 26 to the adjacent end portions 28 of the bottom layer of wood pulp fibers 16. The top surface 30 of the absorbent core, which is not covered by the film, is placed adjacent to the body when the napkin is worn to absorb fluid which impinges upon it.

The above-described sanitary napkin may be made by associating continuous lengths of the wood pulp layers, the intermediate paper layers, the plastic film, and the tissue paper wrapper in superposed relationship. In other forms of the invention, the plastic film may be in the interior of the core and may also be adjacent other types of fibrous material, such as paper, with which it can form the desired compression-type bond, instead of adjacent to a layer of wood pulp fibers, as illustrated in the drawings. After being so assembled, the continuous lengths of the superposed components are then cut by suitable cutting devices which sever the continuous lengths into lengths desired as absorbent cores in the sanitary napkins. The ends of the absorbent core may be severed in an arcuate or tapered shape, as illustrated, through the use of suitably shaped cutting devices. However, the ends of the core may be cut in any desired configuration, including cuts which extend straight across the cores. After the individual absorbent cores are cut, they are enclosed within a liquid pervious cover in the customary manner to form a completed napkin.

In cutting the continuous lengths of the superposed components to form individual absorbent cores, the portion of the film and the portion of the layer of wood pulp fibers adjacent to the cut are compressed sufficiently to form a compression-type bond between the film and the fibrous material. The compression bond may not necessarily be the same or extend entirely throughout the length of the contiguous end portions of the film and the end portions of the fibrous layer. A greater degree of bonding may be obtained in certain portions where, because of the nature of the cutting operation, a higher degree of compression occurs.

As illustrated in FIG. 5 of the drawings, when the plastic film is peeled back from the surface of the adjacent layer of wood pulp fibers, fibers 32 from the layer adhere to the marginal edge portions of the thermoplastic film essentially only along the portions 26 immediately adjacent to the cut end of the film. The remaining portions of the film are not compression bonded to the remaining portions of the layer of wood pulp fibers. There is thus obtained a compression-type bond between the end portions of the film and the end portions of the adjacent layer of wood pulp fibers. The bond is sufficient to prevent free sliding movement, and consequent displacment of the film from its desired position with respect to the other absorbent fibrous components in the core portion of the napkin.

Thermoplastic films which are suitable for use as such barrier layers in sanitary napkins are those which have a sufficiently low softening point to form the compression-type bond under the cutting techniques employed in the manufacturing operation. Polyethylene films of the order of 1 mil or less in thickness and having a low softening point have been found particularly suitable and are preferred. A suitable polyethylene film is a 0.4 mil film obtained from the Extrudo Film Corporation under the designation SF. This film has a softening point of about 100° C. Another suitable polyethylene film is that available from Dow Chemical Company under the designation Type 215 OB 12-7. This film has a softening point of about 70° C. Examples of other acceptable films include low softening-point films of vinyl, plasticized cellulose acetate, and a film formed of the copolymer of ethylene and ethylacrylate, such as that available from Dow Chemical Company under the designation QX 433.1.

It has been determined that films having a softening point of about 120° C. or less can form a suitable compression-type bond with typical cutting devices. As noted above, the particular film which is selected is determined by the cutting device employed and the degree of compression exerted on the film and fibrous material during cutting. The film selected is that which forms the bond during cutting.

The extent of compression bonding, although essentially limited to the end portions of the film and the end portions of the adjacent absorbent fibrous layer, is adequate to retain the film in position during handling by the user of the napkin. Sufficient integrity is present to prevent sliding movement of the film from its desired position so that the napkin can be placed on the body of the user with the film properly positioned in order for it to exercise its liquid barrier properties. This is of importance in that form of napkin wherein the film extends partially up the longitudinal side edges of the absorbent core portion of the napkin, as in the embodiment illustrated in the drawings. The portion of the film extending up the sides of the absorbent core acts as a barrier to the side spread of menstrual fluid absorbed by the napkin. Since the film does not completely cover the sides of the absorbent core portion of the napkin, any tendency of the film to slip or move from its desired position will necessarily cause a portion of one side of the absorbent core portion of the napkin to become uncovered. In that event, the film covering the side of the absorbent core portion of the napkin will not be properly located and side spread failure of the napkin may result. Almost any appreciable degree of movement of the film with respect to the longitudinal side edges of the absorbent core portion of the napkin will, therefore, increase the possibility of side spread failure. This is obviated by the invention.

As seen from the foregoing illustrative embodiment of the invention, there is provided a sanitary napkin having an effectively anchored thermoplastic film barrier layer which, because of its properties, customarily tends to become easily displaced from its desired position in the napkin. The napkin is economical to make because maintaining the film in its desired position does not require the use of adhesive materials or similar bonding agents. The napkin is simple to manufacture and does not require devices for applying adhesives to the film or other supplementary means for effecting a bond between the film and the absorbent core portion of the napkin. The manufacture of the napkin readily lends itself to current manufacturing operations.

It is apparent that variations, modications and changes in the foregoing examples may be made while still remaining within the spirit of the invention.

What is claimed is:

1. The method of making a sanitary napkin comprising covering a surface of a relatively thick layer of cellulosic fibrous material forming a component of the core portion of said napkin with a thermoplastic film, and then simultaneously die cutting said film and said cellulosic fibrous layer, the softening point of said film and the compression exerted during said die cutting on those portions of the film and of the cellulosic fibrous layer adjacent to said cut being such as to form a compression bond between said film and said fibrous layer at said adjacent portions.

2. The method in accordance with claim 1 wherein said layer of fibrous material is wood pulp fibers.

3. The method of making a sanitary napkin comprising covering a surface of a relatively thick layer of cellulosic fibrous material forming a component of the core portion of said napkin with a thermoplastic film having a softening point below about 120° C., and then simultaneously die cutting said film and said cellulosic fibrous layer, the compression exerted during said die cutting on those portions of the film and of the cellulosic fibrous layer adjacent to said cut being such as to form a compression bond between said film and said fibrous layer at said adjacent portions.

4. The method of making a sanitary napkin comprising associating in superposed relationship a plurality of relatively thick, cellulosic fibrous layers, covering a surface of one of said cellulosic fibrous layers with a thermoplastic film, and then simultaneously die cutting said film and said cellulosic fibrous layers to form the absorbent core portion of said napkin, the softening point of said film and the compression exerted during said cutting on those portions of the film and of the cellulosic fibrous layer adjacent to said cut being such as to form a compression bond between said film and said cellulosic fibrous layer at said adjacent portions.

5. The method in accordance with claim 4 wherein the cellulosic fibrous layer covered with said thermoplastic film is positioned adjacent to the bottom of said core.

6. The method in accordance with claim 5 wherein said layer is a layer of wood pulp fibers.

References Cited

UNITED STATES PATENTS

| 2,184,140 | 12/1939 | Cunnington | 156—251 |
| 3,287,195 | 11/1966 | Piazze | 156—251 |

DOUGLAS J. DRUMMOND, Primary Examiner

U.S. Cl. X.R.

156—290